United States Patent [19]

Yaguchi et al.

[11] Patent Number: 4,856,955

[45] Date of Patent: Aug. 15, 1989

[54] LITHOGRAPHIC PLATE TRANSFER SYSTEM

[75] Inventors: Akio Yaguchi, Hidaka; Takayuki Kondo, Hanno, both of Japan

[73] Assignee: Tsubakimoto Chaim Co., Japan

[21] Appl. No.: 179,487

[22] Filed: Apr. 8, 1988

[51] Int. Cl.⁴ ............................................ B65G 47/00

[52] U.S. Cl. .................................... 414/278; 414/331; 198/487.1; 198/468.9

[58] Field of Search ............... 414/273, 275, 277, 278, 414/279, 280, 331, 787; 198/406, 464.2, 468.9, 470.1, 485.1, 486.1, 487.1

[56] References Cited

U.S. PATENT DOCUMENTS 1,271,906 7/1918 Juengst ............................ 198/470.1
1,828,516 10/1931 Wagner et al. .................. 198/484.1
1,876,171 9/1932 Rosener .......................... 414/280 X
1,907,894 5/1933 Stevens et al. ............... 198/486.1 X
1,951,400 3/1934 Dvorak ........................ 198/486.1 X
3,412,841 11/1968 Couch et al. ................ 198/470.1 X
3,681,607 8/1972 Hartman, III ....................... 414/277
4,605,212 8/1986 Kobler ......................... 198/485.1 X

*Primary Examiner*—Robert J. Spar
*Assistant Examiner*—Robert S. Katz
*Attorney, Agent, or Firm*—Steele, Gould & Fried

[57] ABSTRACT

Described herein is a lithographic plate transfer system composed of a lithographic plate pickup conveyor (10), a transfer conveyor (30) and an allocator (60). The plate pickup (10) is provided with a lift for hooking and lifting up lithographic plates delivered by conveyors (12, 14), and a transfer device (24) for transferring lithographic plates to a transfer conveyor (30). The transfer conveyor (30) is provided with a gripper (40) for gripping a folded upper end (S1) of the lithographic plate, and cam mechanisms (50, 50′) adapted to open and close the gripper at loading and unloading positions between the pickup and allocator. The allocator (60) includes a mechanism for allocating unloaded lithographic plates from the transfer conveyor (30) to shelves (62, 64).

4 Claims, 11 Drawing Sheets

LITHOGRAPHIC PLATE TRANSFER SYSTEM

This invention relates to a lithographic plate transfer system which is useful, for example, in newspaper printing for continuously transferring and successively allocating completed printing plates, storing them in positions specified for a number of rotary presses to be used.

Heretofore, the jobs of transferring and allocating completed lithographic plates for the respective rotary presses have relied on manual operations.

In addition to the difficulty of continuous transfer, the manual operations of classifying the printing plates on the respective rotary presses disadvantageously require a great deal of labor and time.

The present invention contemplates to provide a system which can transfer, distribute, classify and store lithographic plates in a continuous fashion by successively transferring them to their destined positions and storing them at those positions in a classified form.

In accordance with the present invention, there is provided a lithographic plate transfer system which includes a plate pickup, a transfer conveyer and an allocator, the pickup having a lift means for hooking and lifting up printing plates which are guided by a delivery conveyer and a transfer means for transferring the printing plates onto a transfer conveyer, which transfer conveyer being located between the pickup and allocator and having a gripper for holding a folded upper end of each printing plate and a gripper opening and closing cam mechanism at each of loading and unloading positions, and the allocator having a mechanism for distributing the printing plates onto specified shelves after unloading same from the transfer conveyer.

Each completed printing plate is sent to a pickup mechanism by a delivery conveyer for classifying and transferring same according to the destined rotary press. The printing plate is hooked and lifted up by a lift means of the pickup mechanism, and conveyed by a transfer means to a position corresponding to its destination.

The gripper on the transfer conveyer is opened by the cam operating mechanism at a transfer position to grip a folded upper side portion of the printing plate on a rest and the transfer conveyer is driven along a path to transfer the plate to a specified allocator.

At an unloading position at the entrance of the allocator, the printing plate on the transfer conveyer is dismounted by operation of the cam opening and closing mechanism, and sent to a down chute downstream of the allocator for distribution to a specified shelf of the allocator.

Hereafter, the invention is described more particularly with reference to the accompanying drawings.

EMBODIMENTS

Figure 12:
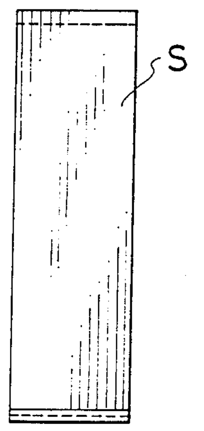
FIG. 12 is a front view of a lithographic plate.
Figure 13:
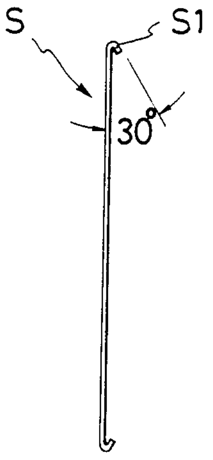
FIG. 13 is a side view of the lithographic plate.

As shown particularly in FIGS. 12 and 13, a lithographic plate consists of a thin aluminum sheet of 0.3 mm in thickens and has its upper end folded at an angle of about 30′ (in some cases angularly folded at the opposite ends). Normally, the printing plate S is lifted up and down by hooking the folded upper end S1.

After completion of arrangement, the lithographic plate S is put on a transfer conveyer by a pickup for transfer to an allocator.

Hereafter, the invention is described more particularly with reference to the drawings.

Figure 1:
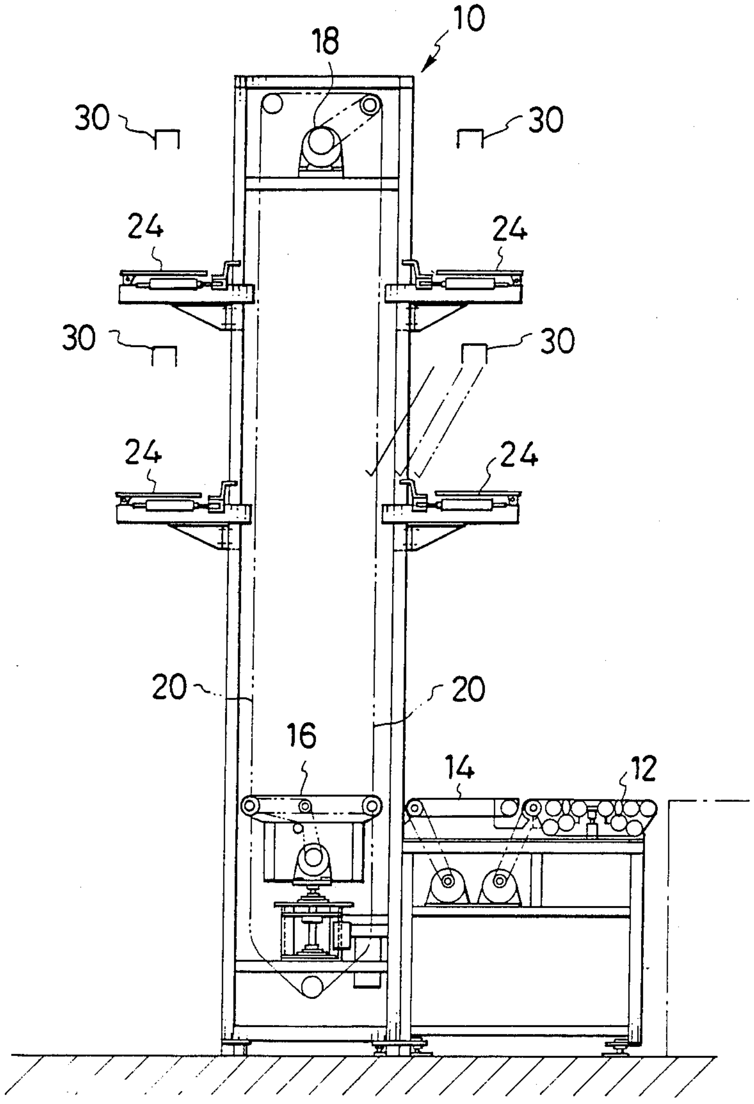
FIG. 1 is a front view of a plate pickup as a whole.
Figure 2:
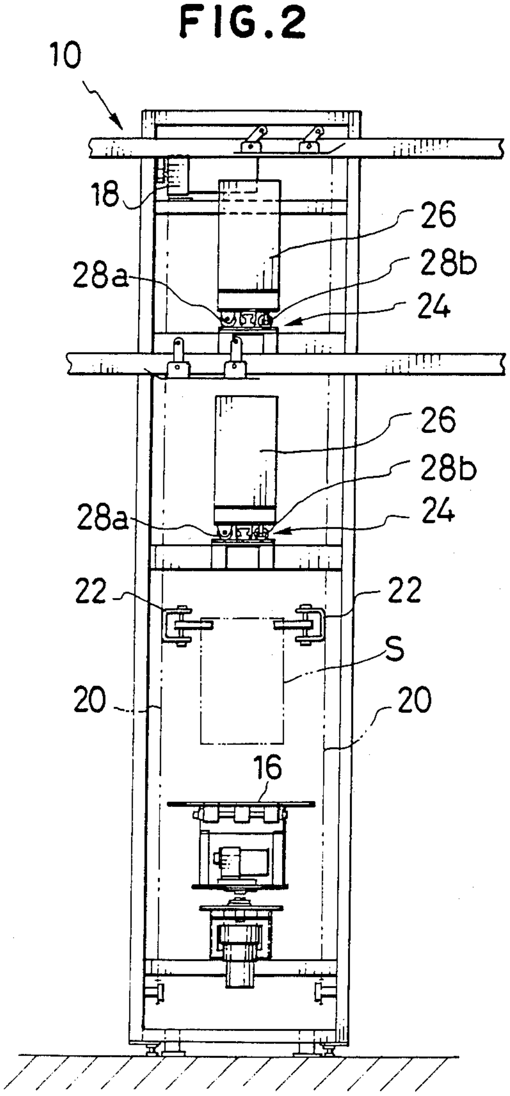
FIG. 2 is a right-hand side view of the pickup of FIG. 1 omitting a delivery conveyer and a gating conveyer.

Referring to FIGS. 1 and 2, there is shown a plate pickup 10 in front and right-hand side views, respectively. A printing plate S which has been brought in by the delivery conveyer 12 in a transverse posture is guided onto the pickup 10 by a gating conveyer 14, which is operated intermittently in synchronism with hooks 22 (FIG. 2) attached to a pair of lift chains 20, and its posture is turned through 90 degrees by the rotating means 16 to lie in a predetermined direction. The term "predetermined direction" means a direction to one of four overhead type transfer conveyers 30 which transfer the printing plates as will be described hereinafter.

The pickup 10 has its components arranged symmetrically on the opposite sides of its longitudinal axis as shown in FIG. 1. Therefore, the following description deals with the construction and operation on one side of the pickup to avoid unnecessary repetitions.

Figure 3:
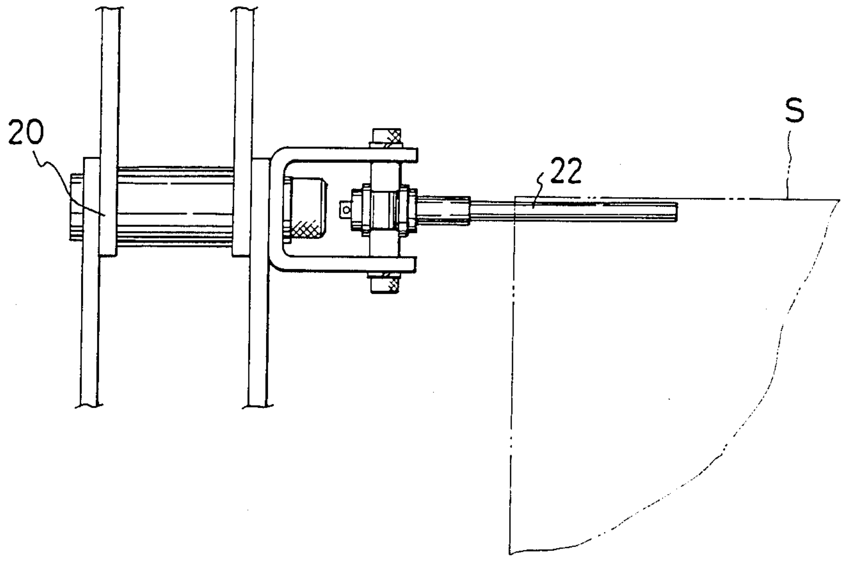
FIG. 3 is a front view of a hook.

A pair of hooks 22 are opposingly attached to a pair of endless lift chains 20 which are driven by a motor 18 in both directions as shown in FIGS. 2 and 3. The folded upper end of a lithographic plate S which has been brought into the pickup 10 in an oriented state as described hereinbefore is caught on hooks 20 and lifted up along the tracks of the lift chains 20 and placed on a transfer mechanism 24.

Figure 4:
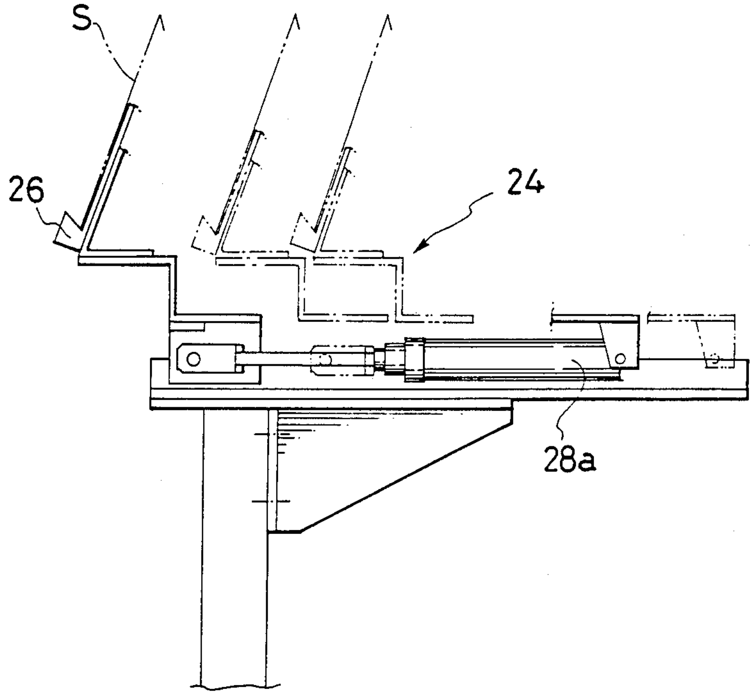
FIG. 4 is a partial front view of a transfer means.
Figure 5:
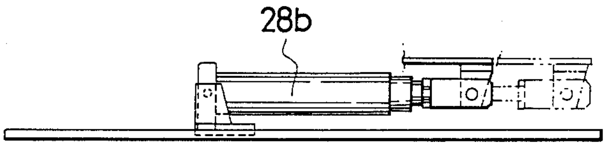
FIG. 5 is a front view of a retracting cylinder of a transfer mechanism.

FIGS. 4 and 5 show the transfer mechanism 24. The printing plate S is lifted up to a point slightly above a predetermined rest 26, and stopped there together with the hooks 22. The rest 26 which is in a stand-by position indicated by chain line in FIG. 4 is moved forward by an advancing cylinder **28*a* to proceed to a plate receiving position (the position indicated by solid line) under the lithographic plate S. Then, the lift chains 20 are lowered to place the printing plate S on the rest 26. After this, the advancing the cylinder 28*a* is exhausted, while a retracting cylinder 28*b* is actuated to move the rest 26 back into a transfer position indicated by two-dot chain line, holding the printing plate S in stand-by state for transfer to the transfer conveyer 30. In the transfer position of the transfer mechanism 24, the folded upper end of the lithographic plate S is located in a position in the vicinity of the lower side of the transfer conveyer 30**.

Figure 6:
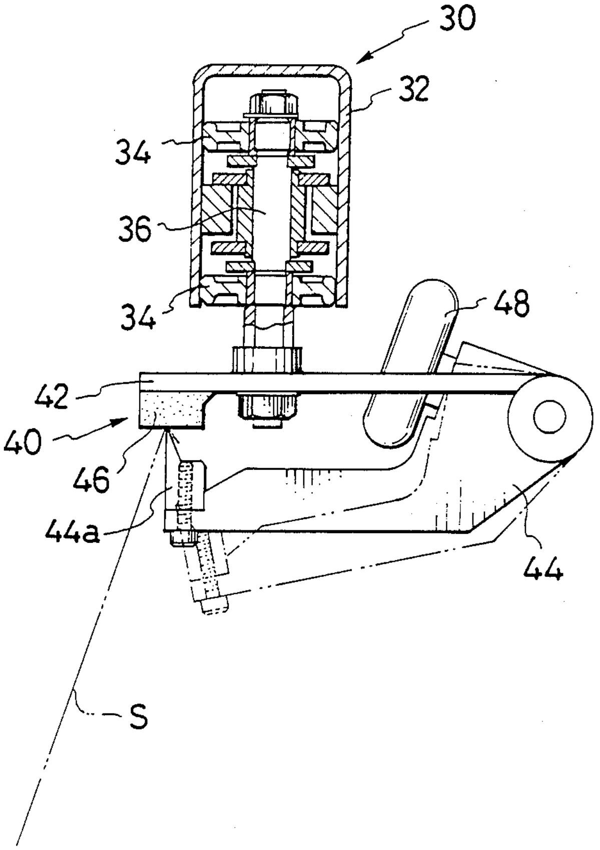
FIG. 6 is a section of a transfer conveyer with a gripper.
Figure 7:
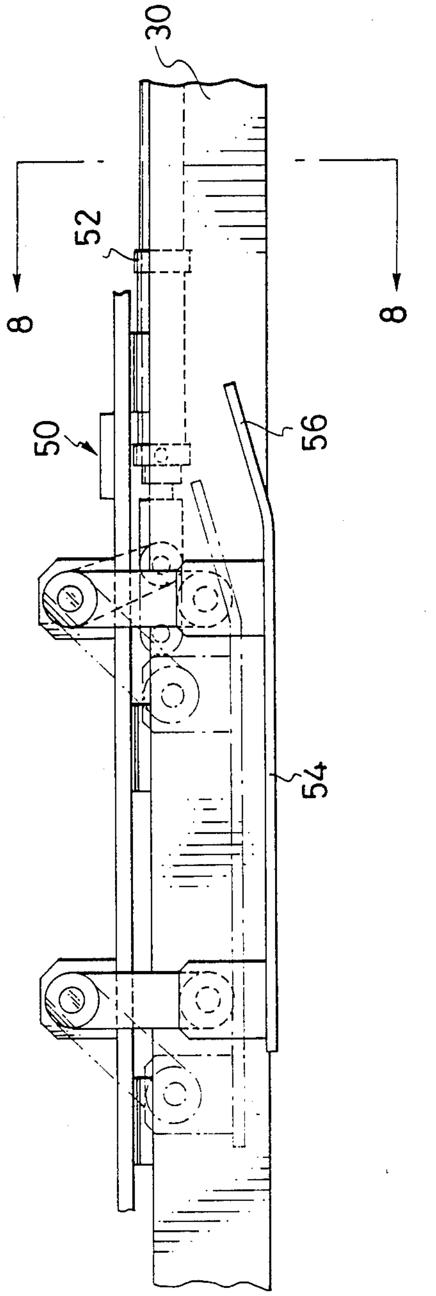
FIG. 7 is a front view of a gripper opening and closing mechanism.
Figure 8:
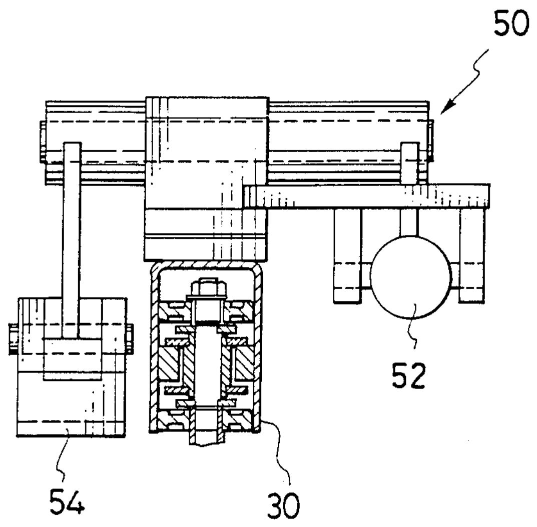
FIG. 8 is a section taken on line 8—8 of FIG. 7.

Referring to FIGS. 6 to 8, there is shown the transfer conveyer 30 with a gripper and a gripper opening and closing cam mechanism 50. A gripper 40 is attached to the lower end of a suspended shaft 36 rotatably supporting thereon upper and lower rollers 34 which rolling and along a rail 32. The gripper 40 is constituted by a fixed plate 42 which is securely fixed to the suspended shaft 36, and an arm 44 which has its one end pivotally supported on the fixed plate 42. The tip end 44*a* of the arm 44 is constantly urged by a spring (not shown) toward a resilient member 46 which is securely fixed on the other end of the fixed plate 42, to grip the lithographic plate S1 between the resilient member 46 and the arm 44. Also mounted on the arm 44 is a follower roller 48 which is operated by the cam mechanism 50 as will be described hereinafter to open the arm 44 in a direction opposite the arm biasing direction of the above-mentioned spring.

The gripper opening and closing cam mechanism 50 is located on the rail 32 at a point above the plate transfer position from the rest 26 of the transfer device 24, and adapted to move a cam plate 54 downward by a cylinder 52 in response to a signal indicating existence of a lithographic plate on the rest 26. The cam plate 54 is provided with a inclined portion 56 which guides the follower roller 48 to open the gripper 40 by pressing the arm 44 against the biasing action of the spring. As the follower roller 48 comes off the cam plate 54, the arm 44 grips the folded upper end S1 of the lithographic plate S between its tip end 44*a* and the resilient member 46 on the fixed plate 42 to transfer the plate along the rail 32. When there is no lithographic plate S on the rest 26, the cam plate 54 is not actuated, permitting the gripper 40 to pass by.

Figure 9:
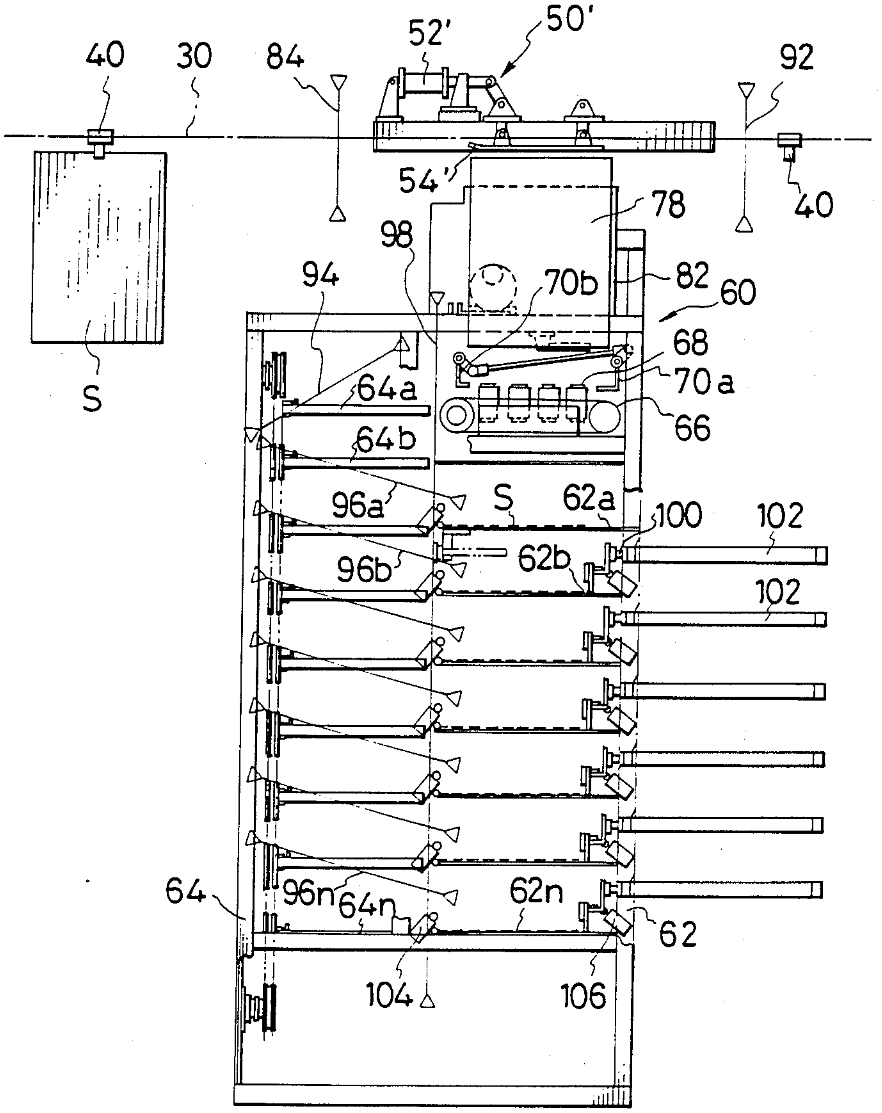
FIG. 9 is a front view of an allocator.
Figure 10:
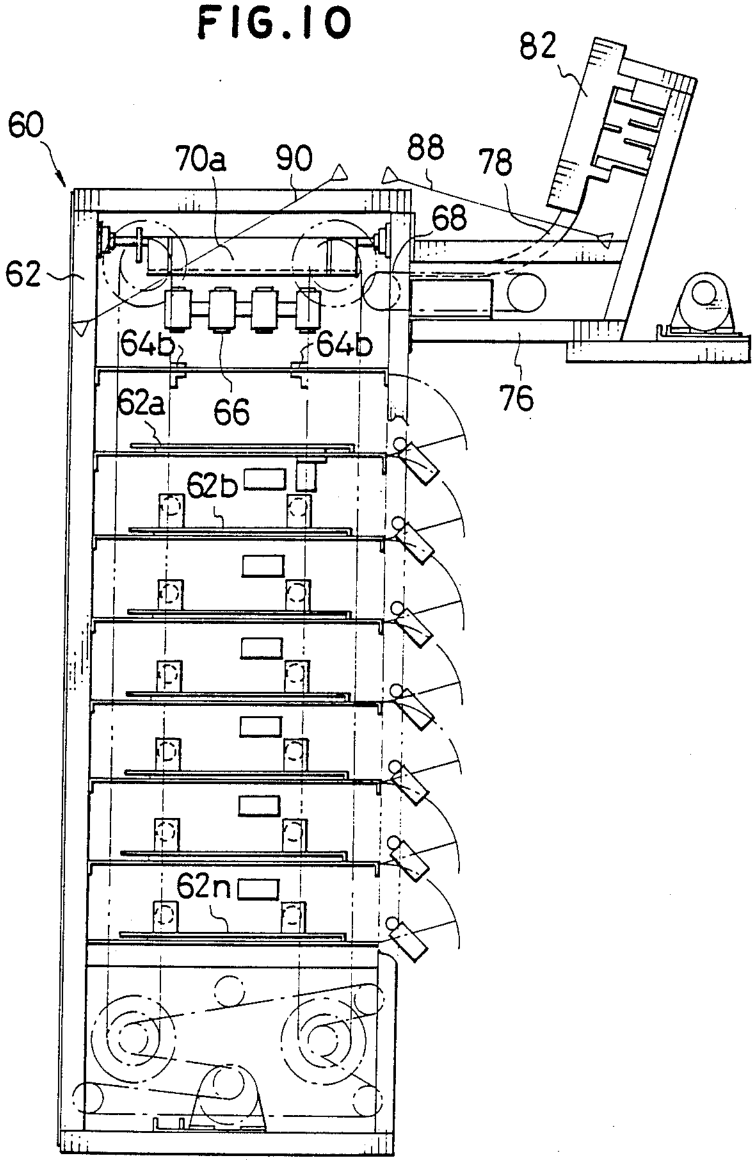
FIG. 10 is a side view of the allocator.
Figure 11:
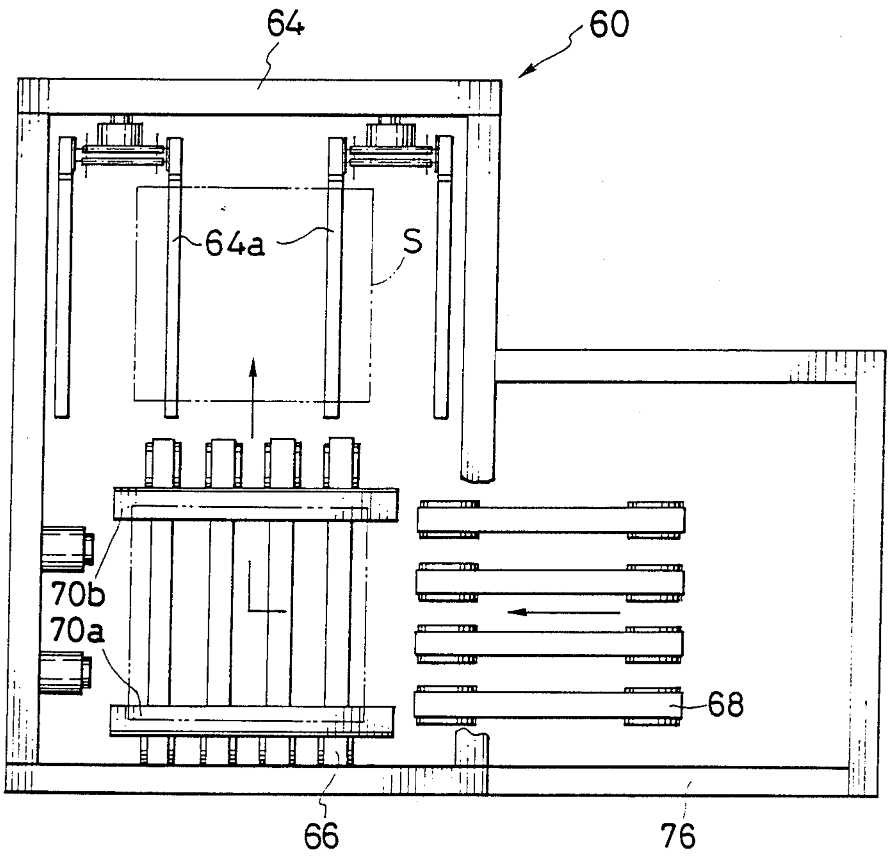
FIG. 11 is a top view of major components of the allocator.

FIGS. 9 to 11 illustrate an allocator 60, which is provided with a plural number of shelves 62*a*, 62*b* . . . 62*n* on an allocating rack 62 to store printing plates on the shelves alloted to a plural number of rotary presses to which the respective printing plates are destined. Adjacent thereto provided on one side of the allocating rack 62 is a movable rack 64 which is provided with a plural number of shelves 64*a*, 64*b* . . . 64*n* at the same pitch as the shelves of the allocating rack 62.

The movable rack 64 is formed with shelves 64*a*, 64*b* . . . 64*n* which support a lithographic plate S from beneath at the same level positions on the confronting sides of a pair of vertically running endless belts provided parallelly as shown in FIG. 11.

The above-mentioned endless belts are each passed around a pair of vertically spaced drive and driven pulleys, and driven to move the respective shelves donwardly.

A transverse conveyer 66 with a transfer surface at the same level as the shelf 64*a* is mounted in an uppermost portion of the allocating rack. Attached opposingly over the conveyer 60 are a pair of supporting pawls 70*a* and 70*b* which can be operated to spread away form each other. A longitudinal feed conveyer 68 with a transfer surface in the same plane as the supporting surfaces of the pawls 70*a* and 70*b* is mounted on support frames 76 which are projected from the allocating rack.

The printing plate S which has been transferred by the transfer conveyer 30 to a dismounting position above the allocator 60 is abutted against a stopper 82 when the gripper 40 is opened by a cam mechanism 50' similar to the one described hereinbefore. Consequently, the released gripper 40 alone is moved forward, unloading and sending the printing plate S into a chute 78.

At the unloading position of each allocator 60, the allocating rack 62 and the movable rack 64 are located, along with the plate unloading means which is constituted by the cam mechanism 50' with the cam plate 54' for opening the gripper 40 and the cam operating cylinder 52' and the stopper 82. The cam plate 54' is operated by the cylinder 52' to assume an operating position for releasing the gripper 40 or a non-operating position for passing the gripper 40 in gripping state. Located immediately beneath the cam plate 54' is a chute 78 the lower end of which is disposed close to the transfer surface of the longitudinal feed conveyer 68. A stopper 82 is attached to the front edge of the chute 78, the stopper 82 being raised into an upright position when the cam plate 54' is moved into the operating position to block passage of the lithogaphic plate S and felled into a flat position when the cam plate 54' is moved into the non-operating position to permit passage of the lithographic plate S.

At the entrance of the pickup 10, the destinations of the lithographic plates S are input to a computer in the order of entrance through shift register. For example, a printing plate S with an input destination to the shelf 62*a* on the allocating rack 62, is gripped up by the gripper 40 and fed forward by the transfer conveyer 30. Upon approaching the unloading position above the allocating rack 62 with allocating shelves 62*a*, the arrival of the printing plate S is detected by an unloading signal means 84 which is located upstream of the unloading position, for example, by detecting the arrival from interruption of a light flux of a photoelectric tube and producing an interruption signal to actuate the cylinder 52' for advancing the cam plate 54' into the operating position and raising the stopper 82 into the upright position.

The lithographic plate S which is unloaded by the release of the gripper 40 is dropped into the chute 78 under guidance of the stopper 82 and slided down onto the longitudinal feed conveyer 68, thereby handing the printing plate S to the opposing support pawls 70*a* and 70*b*.

An unloading signal means 88 is provided over the chute 78 to detect the passage of the unloaded lithographic plate S, and a plate arrival detection means 90 is provided over the opposing support pawls 70*a* and 70*b*.

After releasing the plate, the gripper 40 passes through a gripper detection signal means 92 which is located downstream of the unloading position. In response to each signal which is received from the gripper dtection means 92 on passage of a gripper, the movable rack shelves 64*a*, 64*b* . . . 64*n* are lowered by a distance corresponding to one pitch of the allocating rack shelves.

The transverse feed conveyer 66 and the longitudinal feed conveyer 68 may be constantly put in operation, or otherwise may be actuated by a signal from the unloading signal means 88 over the chute 78, if desired, stopping them in response to a signal from a plate arrival signal means 94 which detects the transfer of the printing plate S from the transverse feed conveyer 66 to the movable rack shelf 64*a*.

The opposing support pawls 70*a* and 70*b* are spread by a detection signal from the plate arrival signal means 90, dropping the printing plate S onto the transverse feed conveyer 66.

In this instance, the transfer speeds of the transverse and longitudinal feed conveyers 66 and 68 are preset such that the dropped printing plate S is transferred onto the movable rack shelf 64*a* before the unloaded gripper 40 reaches the gripper passage signal means 92.

Plate detection means 96*a*, 96*b* . . . 96*n* are provided at the stop positions of the respective movable rack shelves 64*a,* 64*b* . . . 64*n,* and plate passage and retraction signal means 98 is provided at the front ends of the allocating shelves 62*a,* 62*b* . . . 62*n* on the side of the movable rack shelves 64*a,* 64*b* . . . 64*n.* Further, mounted on the rear ends of the allocating shelves 62*a,* 62*b* . . . 62*n* are cylinder means 102 each with a transfer rod 100, which are actuated to draw the printing plates S onto the allocating shelves from the movable rack shelves 64*a,* 64*b* . . . 64*n* in response to signals from the shift register of the computer operating on the allocation information given at the time of dispatching the printing plates as mentioned hereinbefore.

Accordingly, when a printing plate S with a specified destination is stopped in a position at the level of a corresponding shelf 62*a* on the allocating rack 62, the cylinder means 102 is actuated to draw the printing plate S onto the specified shelf 62*a* of the allocating shelf from the movable rack shelf by means of an attracting or gripping member which is provided at the fore end of the transfer rod 100.

In a case where the attracting member utilizes an electromagnet or vacuum for the attracting action, on-off of the electromagnet or vacuum is effected by a known means at the protruded and retracted ends of the transfer rod 100.

Limit switches 104 and 106 are provided at the protruded and retracted ends of the transfer rod 100 to limit its stroke length.

In this manner, the lithographic plates S are allocated and stored on the shelves of the respective destinations, and discharged whenever a necessity arises to mount same on a desired rotary press.

As described hereinbefore, according to the present invention, the operation of sending completed printing plates to the respective destined rotary presses is automated, improving the efficiency of distributive transfer of printing plates to a marked degree while facilitating and speeding up the jobs of classifying and selecting the printing plates at the respective unloading positions, effecting the distribution, allocation and storage of the printing plates by a continuous operation in a secure and facilitating manner without relying on manual labors.

What is claimed is:

1. A lithographic plate transfer system, comprising:

a lithographic plate pickup (10);

a transfer conveyer (30); and an allocator (60);

said pickup (10) including a lift means (20) for hooking and lifting lithographic plates (S) delivered by conveyers (12) and (14), and a transfer means (24) for transferring said lithographic plates to said transfer conveyer (30);

said transfer conveyer (30) including grippers (40) for gripping a folded upper end portion (S1) of each lithographic plate, and gripper opening and closing cam mechanisms (50, 50') located in loading and unloading positions between said pickup and allocator; and said allocator (60) including a mechanism for allocating the unloaded lithographic plates from said conveyer (30) to shelves (62, 64).

2. The lithographic plate transfer system of claim 1, wherein said lift means of said pickup (10) is provided with a pair of circulating chains (20, 20) having hooks (22, 22) for hanging the folded upper end of said lithographic plate, and said transfer means includes a rest (26) reciprocable between a pick-up position for receiving a lithographic plate from said lift chains and a transfer position for handing the lithographic plate to said transfer conveyer and drive means (28*a,* 28*b*) therefor.

3. The lithographic plate transfer system of claim 1, wherein said transfer conveyer (30) is driven along a path (32) and said gripper (40) is constantly biased into a closing position.

4. The lithographic plate transfer system of claim 1, wherein said allocator (60) includes: a chute (78) located at the unloading position of said lithographic plate; a longitudinal feed conveyer (68) located adjacent to said chute; a pair of openable support pawls (70*a,* 70*b*) located adjacent to the discharge end of said longitudinal feed conveyer, a transverse feed conveyer (66) located beneath said support pawls; a vertically movable rack (64) located adjacent to the discharge end of said transverse feed conveyer (66); an allocating rack (62) located adjacent to the discharge end of said movable rack; and plate transfer means (100, 102) for transferring lithographic plates from said movable rack to said allocating rack; successively allocating, storing lithographic plates on predetermined shelves of said allocating rack (62).

* * * * *